(12) United States Patent
Holub et al.

(10) Patent No.: US 11,714,269 B2
(45) Date of Patent: Aug. 1, 2023

(54) APPARATUS AND METHOD FOR CAPTURING AN IMAGE

(71) Applicant: Carl Zeiss Microscopy GmbH, Jena (DE)

(72) Inventors: Oliver Holub, Jena (DE); Mirko Liedtke, Jena (DE); Stanislav Kalinin, Weimar (DE); Dieter Huhse, Berlin (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 195 days.

(21) Appl. No.: 17/192,621

(22) Filed: Mar. 4, 2021

(65) Prior Publication Data

US 2021/0278650 A1 Sep. 9, 2021

(51) Int. Cl.
*G02B 21/00* (2006.01)

(52) U.S. Cl.
CPC ....... *G02B 21/0072* (2013.01); *G02B 21/008* (2013.01); *G02B 21/0032* (2013.01); *G02B 21/0036* (2013.01)

(58) Field of Classification Search
CPC ............ G02B 21/0072; G02B 21/0032; G02B 21/0036; G02B 21/008; G02B 21/00; G02B 21/0004; G02B 21/002; G02B 21/0024; G02B 21/0052; G02B 21/006; G02B 21/0076; G02B 21/06; G02B 21/36; G02B 21/361; G02B 21/365; G02B 21/367; G01N 21/6456; G01N 21/6458; G01N 2021/6463; G01N 2021/6478; G01N 21/6486
USPC ....... 359/368, 362, 363, 369, 385, 387, 388, 359/390
See application file for complete search history.

(56) References Cited

FOREIGN PATENT DOCUMENTS

| CN | 109254072 A | * | 1/2019 |
| DE | 102017122858 A1 | | 4/2019 |
| DE | 102020201808 A1 | * | 8/2021 |
| WO | 02/014811 A1 | | 2/2002 |
| WO | 2017/055405 A1 | | 4/2017 |

OTHER PUBLICATIONS

German Search Report for Priority Document No. DE 10 2020 202 804.4, dated Nov. 26, 2020.
Huff, J.; "The Airyscan detector from ZEISS; confocal imaging with improved signal-to-noise ratio and super-resolution"; Nature Methods 2015; 12:i-ii ; https://doi org/10.1038/nmeth.f.388.

* cited by examiner

*Primary Examiner* — Arnel C Lavarias
(74) *Attorney, Agent, or Firm* — Duane Morris LLP

(57) ABSTRACT

Apparatus and method for capturing an image having a detection beam path for guiding detection radiation from a sample to a detector having a plurality of detector elements. The detector has no more than ten and, preferably, four or five detector elements; and an evaluation unit, which is configured to carry out an evaluation in accordance with the Airyscan method on the image data captured by means of the detector and which generates a high-resolution image.

6 Claims, 5 Drawing Sheets

APPARATUS AND METHOD FOR CAPTURING AN IMAGE

RELATED APPLICATIONS

The present application claims priority benefit of German Application No. DE 10 2020 202 804.4 filed on Mar. 5, 2020, the contents of which is incorporated by reference in its entirety.

FIELD OF THE INVENTION

The invention relates to an image capturing method and apparatus, in particular by means of a microscope.

BACKGROUND OF THE INVENTION

Modern laser scanning microscopes (LSM) such as the 800/900 LSMs and 880/980 LSMs (Carl Zeiss Microscopy GmbH) have detectors with 32 channels (=32 detector elements), which permit fast confocal parallel sampling of the so-called point spread function (PSF) of the microscope during the microscopic image scanning. Such detectors are also referred to as Airyscan detectors below. The Airyscan detector is arranged in an image plane as a detector plane, which is conjugate to the origin of the detection radiation or to the focus. The detection radiation incident on the detector, including out-of-focus components, is captured by the multiplicity of detector elements, facilitating the capture and evaluation of the respective local distribution of the intensity levels of the captured detection radiation (Huff, J. 2015: The Airyscan detector from ZEISS: confocal imaging with improved signal-to-noise ratio and super-resolution; Nature Methods 12, i-ii; https://doi.org/10.1038/nmeth.f.388). Images with an improved resolution (so-called Airyscan-SR images, where SR represents super-resolution) are subsequently generated by an appropriate combination of these data by calculation. The generation of, in particular, high-resolution images on the basis of the image data from a detector with a plurality of detector elements and on the basis of the procedure briefly outlined above is also referred to as Airyscan method below within the scope of this application.

SUMMARY OF THE INVENTION

The invention is based on the object of proposing a simplified structure of an apparatus, in particular of a microscope, for high-resolution imaging.

The object is achieved by the subject matter of the independent claims. Advantageous developments are found in the dependent claims.

The object is achieved by means of an image capturing apparatus. The latter has a detection beam path with a detector, the detector having a plurality of detector elements. According to the invention, the detector has at most ten and, in particular, four or five detector elements.

In an advantageous embodiment, the detector for capturing the detection radiation is arranged in the detection beam path in a plane conjugate to a detection plane. The detector has a plurality of detector elements in a plane extending orthogonal to the detection beam path.

The captured image data are evaluated by means of an evaluation unit configured to this end, for example by means of a computer, in accordance with the Airyscan method (see introductory part of the application) and a high-resolution image is generated. To this end, detection light imaged into the detector plane is captured, with each of the detector elements acting as a so-called pinhole and capturing a component of the detection light.

To assess the efficiency and quality of the invention, simulations were carried out with different synthetically generated test samples, wherein a PSF was scaled to the corresponding detector channels and a combination by calculation was undertaken according to the Airyscan method. Surprisingly, the detailed simulations can be used to show that already more than 90% of the previous Airyscan performance (both laterally and axially) can be obtained when detector geometries with 4 or 5 channels are used. By way of example, if an Airyscan detector obtains an improvement in the lateral resolution by a factor of 1.7 in relation to the confocal resolution of an LSM, a quadrant detector can already obtain an improvement with a factor of 1.6. If a 5-channel detector is used, it is even possible to obtain 97% of the axial resolution performance of a current 32-channel detector.

Therefore, the use of small, compact, and cost-effective detectors, in particular PMT or APD detectors, instead of an Airyscan detector (see above; Huff 2015) is proposed. By way of example, such alternative detectors are corresponding PMT or APD arrays such as, for example, quadrant PMT detectors, quadrant photodiodes, quadrant APD/SPAD detectors (SPAD=single-photon avalanche detector), arrays of MPPC/SiPM elements (MPPC=multi-pixel photon counter; SiPM=silicon photomultiplier) or 5-channel detectors.

The use of such detector variants allows equipping even of already existing laser scanning microscopes in cost-effective fashion. Moreover, detectors with four or five detector elements can easily be adapted to the round shape of the beam cross section. The small number of detector elements (which are also referred to as channels herein) of such detectors can advantageously be arranged in a circular fashion, i.e. on a circular area. An upstream light redistribution on the detector elements, for example on a fiber bundle basis, can be dispensed with when such an embodiment is implemented. The detector elements can be arranged in a 2×2 grid in further embodiments.

Quadrant detectors and 5-channel detectors have an equivalent behavior in respect of the improvement in the lateral resolution. A quadrant detector additionally offers the advantage of virtually any desired scalability of the PSF diameter on the detector (e.g. in combination with a pinhole stop with a fixed or variable diameter in a plane that is conjugate to the focal plane). A PMT quadrant detector can have a relatively large detector diameter (typically of the order of 1-5 mm), which nevertheless supplies a fast, sensitive, and low-noise signal. However, such a detector will also have web widths (i.e. mechanical regions in which incident light is not detected, so-called dead regions) with typical widths of 0.1-0.2 mm between the quadrants, i.e. between the individual detector elements.

In order to limit the losses of light and information caused by the webs, a phase element, for example a quadrant phase mask or a refractive or diffractive optical element (e.g. a phase mask or grating), can be introduced into the beam path in an advantageous development of the invention. Partial beams which are then steered to the corresponding detector elements can be generated from the beam of the detection radiation by way of the effect of the phase element.

The phase element is arranged in the detection beam path. Incident detection radiation is split into at least two partial beams by the effect of the phase element. Then, each of the partial beams is steered to a different detector element of the detector in each case. The split into partial beams can substantially be implemented by diffractive or refractive effects of the phase element. Measurement values caused by the partial beams are captured. Image data are generated in the evaluation unit on the basis of the captured measurement values, in particular by carrying out the Airyscan method, and are provided for an image output. The image data and, optionally, the measurement values are stored to this end and prepared further when necessary. By way of example, the phase element can be a phase grating or a phase mask.

If a phase element is used, this dispenses with the necessity of measures for circumventing the arising dead regions, for example by the discontinuation of the use of additional optical elements directly upstream of the detector which still deflect the light directed at the dead region into the detector (e.g. a prism stop cross or an adapted microlens array). Moreover, possibly required size-scaling coupling optics in the detection beam path upstream of the detector become simpler if a phase element is used.

Advantageously, the phase element is accommodated in the beam path in such a way that it can be used for PSF sampling, as a result of which novel configurations of microscopes are conceivable. Depending on the relative installation position of the phase element, the light redistribution brought about by the phase element must also be taken into account in algorithmic fashion during the combination by calculation. Ideally, it is used in such a way that the PSF sampling is already implemented by the four quadrants of the phase element, the light redistribution remains in the respective quadrant, the phase element generates one light spot on a quadrant detector per quadrant and therefore only a single phase element needs to be used per LSM with a chosen sample-side imaging optical unit in order to operate all detectors present in the LSM. The invention can be used in optical arrangements, in particular in microscopes, which detect in a plurality of channels. By way of example, in a 3-channel LSM, for example, it is then possible by means of the phase element to simultaneously generate four spots on each of three quadrant detectors. A corresponding statement applies to a combination of phase element and detector with a different number of detector elements. By way of an example, such a configuration is realized if the phase mask is installed in confocal fashion with respect to the focal plane, i.e. instead of the pinhole, for example.

Furthermore, the invention is usable in microscopes in which a sample to be captured is illuminated simultaneously by a plurality of illumination spots (spots) or illumination lines.

A substantial advantage of the invention lies in the option of equipping a high-resolution microscope, for example, with a cost-effective detector. The latter can replace an Airyscan detector which, according to the current state of the art, is a highly complex, not very compact component that is assembled from complicated component parts and is complicated to adjust. The reduction in lateral and/or axial resolution in relation to an Airyscan detector that has to be accepted in the case of such an exchange of the detectors is less than originally expected proceeding from an Airyscan detector according to the prior art.

The reduction in the lateral or axial resolution that occurs is still so small that it offers an acceptable compromise between simplification in terms of instruments and the greatest possible resolution improvement by the Airyscan method.

A (laser) scanning microscope equipped with a quadrant detector could be produced at significantly lower cost than an LSM produced with a conventional Airyscan detector— and, incidentally, at only slightly higher cost than a one-channel PMT (one-channel detector). Moreover, a fiber coupling could be dispensed with, facilitating a more compact structure of the microscope.

BRIEF DESCRIPTION OF THE DRAWINGS

The invention is described in more detail below on the basis of exemplary embodiments and figures. In detail.

DESCRIPTION OF THE INVENTION

The invention will be explained on the basis of exemplary embodiments, with the same reference signs denoting the same technical units or elements provided nothing else is expressly stated.

Figure 1:
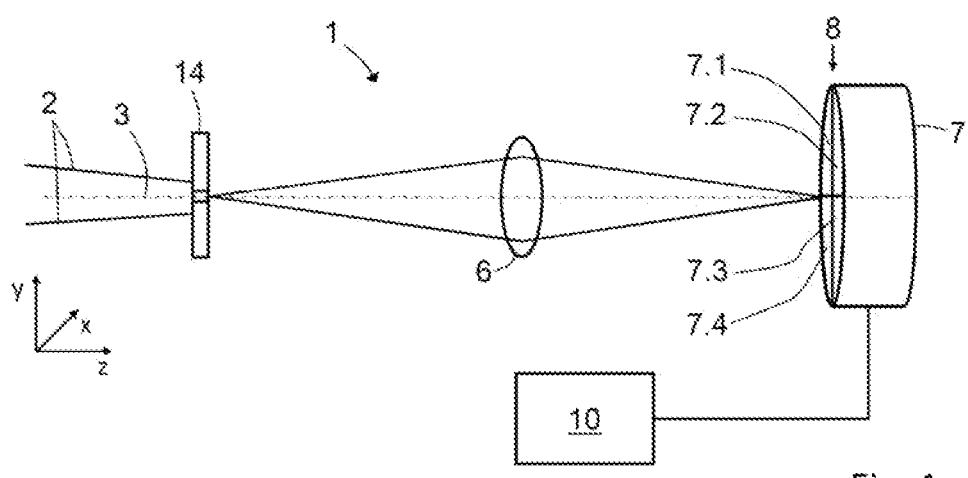
FIG. 1 shows a schematic illustration of a first exemplary embodiment of an apparatus according to the invention.

A first exemplary embodiment of an apparatus according to the invention is illustrated in FIG. 1 in exemplary fashion and not true to scale. A beam of detection radiation, in particular light in the visible and/or infrared wavelength range, propagates along a beam path 2, in particular a detection beam path 2, of a microscope as apparatus 1 (not illustrated in any more detail) and strikes a pinhole 14. As a result of the effect of the latter, out-of-focus components of the detection radiation are partially removed from the beam path 2 and the beam diameter is restricted. The pinhole 14 can be embodied with a fixed or with a variably adjustable diameter of the passage opening. In addition to partly blocking unwanted radiation components, the pinhole 14 can be used to adapt the beam diameter to the dimensions of the detector 7.

By means of downstream optics 6, which can be substantially more complex than shown in FIG. 1, the detection radiation that has passed through the pinhole 14 is steered to different detector elements 7.1 to 7.4 of a detector 7, which is embodied as a quadrant detector, in the detector plane 8. The image data captured by means of the detector 7 are evaluated by means of an evaluation unit 10 and optionally stored. The evaluation unit 10 is configured to carry out the Airyscan method by virtue of the point spread function (PSF) of the apparatus 1 being sampled in parallel on the basis of the captured image data.

Figure 2A:
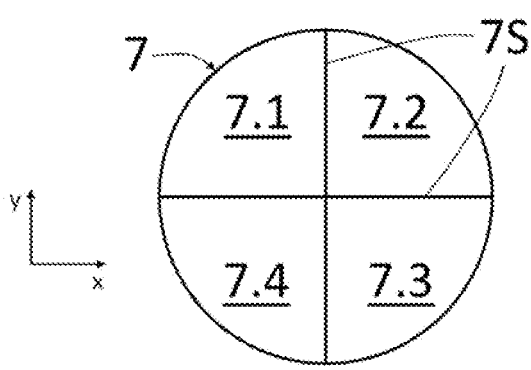
FIG. 2a shows a schematic illustration of the cathode arrangement of a quadrant PMT detector.

In particular, a quadrant PMT detector (FIG. 2a) with the detector elements 7.1 to 7.4 or a detector with five detector elements 7.1 to 7.5 (FIG. 2b) can be used as detectors 7.

A phase element 4 can be disposed upstream of the detector (FIGS. 3, 4) in order to reduce or even avoid unwanted light losses at the webs 7S (only some of which have been labeled in exemplary fashion) which separate the detector elements 7.1 to 7.n from one another.

Figure 3:
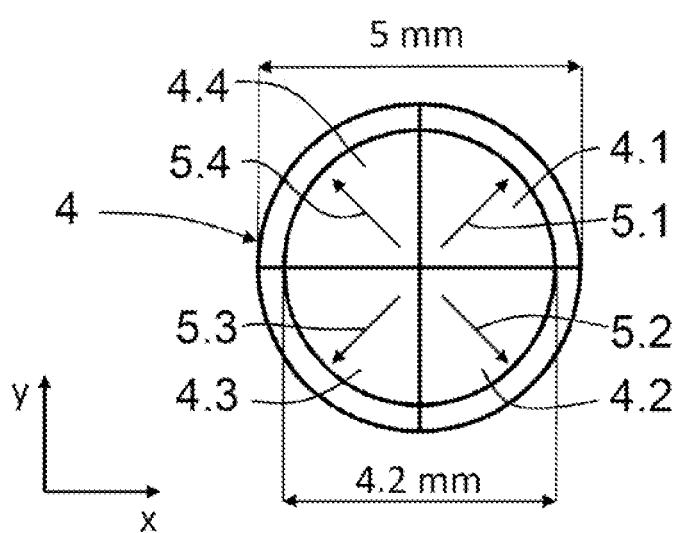
FIG. 3 shows a schematic illustration of a first exemplary embodiment of a phase element with four quadrants.

The phase element 4 can be subdivided into a plurality of partial areas 4.1 to 4.4 (FIG. 3). The phase element 4, for example a phase mask, can be subdivided into four quadrants of equal size, which each deflect the light away from the center of the phase element 4, as symbolized in FIG. 3 by arrows. The arrows schematically represent partial beams 5.1 to 5.4 caused by the effect of the phase element 4. In the case of the simplest design of the phase element 4, the quadrants are faces that are tilted with respect to one another or prisms with surfaces that are tilted with respect to one another, which thus generate lateral beam offsets or beam deflections.

Figure 2B:
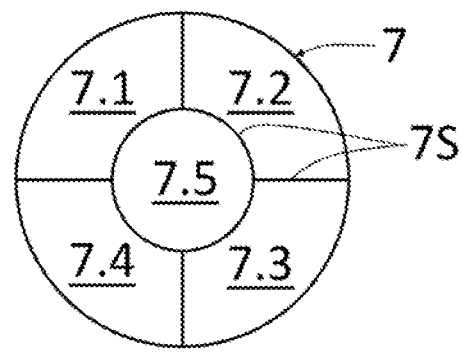
FIG. 2b shows a schematic illustration of the cathode arrangement of a 5-channel detector.

While the split of the radiation into the partial beams 5.1 to 5.4 is brought about by a uniform deflection of components of the radiation by means of the phase element 4, a phase element 4 in which refraction/diffraction (depending on setup) in the central region of the phase element 4 is avoided can be used if use is made of a detector 7 with five detector elements 7.1 to 7.5 (see FIG. 2b).

Figure 4:
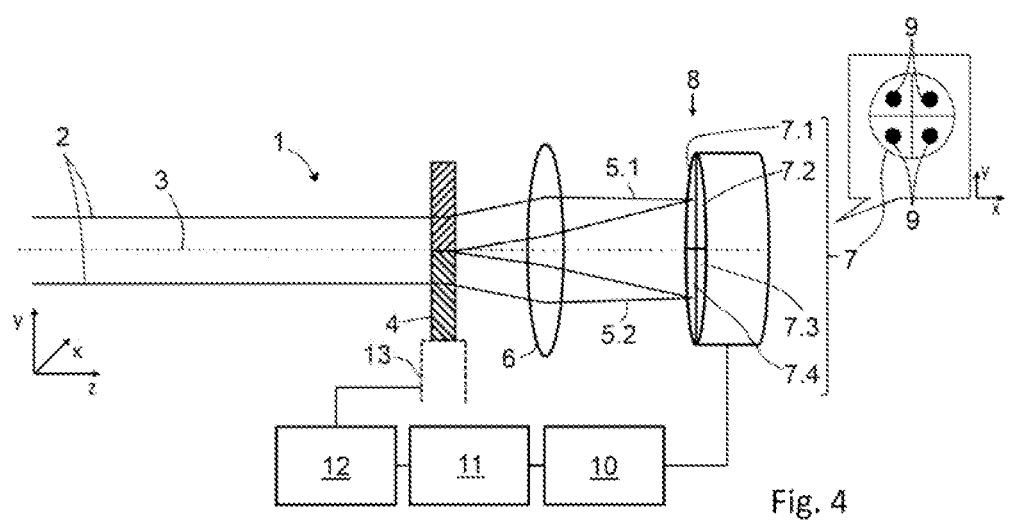
FIG. 4 shows a schematic illustration of a second exemplary embodiment of an apparatus according to the invention.

In a second exemplary embodiment of the apparatus according to the invention, a beam, in particular a light beam of detection radiation, propagates along a beam path 2 and strikes a phase element 4 which is embodied as a phase mask in this case (FIG. 4). In further embodiments, the phase element can be embodied in the form of a grating, for example. As a result of the effect of the phase element 4, the radiation is split into, for example, four partial beams 5.1 to 5.4, of which only the partial beams 5.1 and 5.2 are shown in the beam path so as to have a better overview.

The partial beams 5.1 to 5.4 are steered by means of optional downstream optics 6 to different detector elements 7.1 to 7.4 of the detector 7 in the detector plane 8 and are imaged there in four spots 9 (see image insert). By way of example, a quadrant PMT detector, a quadrant photodiode, a quadrant APD/SPAD detector, arrays of MPPC/SiPM elements or a 5-channel detector can be used as detector 7, which captures the measurement values of the respective partial beams 5.1 to 5.4 (partial beams 5.1 to 5.5 in the case of a 5-channel detector) and transmits these to the evaluation unit 10. Measurement values of a set or dynamically selected number of detector elements 7.1 to 7.4 (detector elements 7.1 to 7.5 in the case of a 5-channel detector) can be combined in this case by calculation in the evaluation unit 10 ("binning").

A control unit 11, which is connected to the evaluation unit 10, can optionally be present. If necessary, required corrections to the position of the phase element 4 in the beam path 2 can be identified and the control commands required to carry out the corrections can be generated. The control commands are used to control a drive unit 12 and the alignment and relative position of a component 13 (indicated in the illustration) holding the phase element 4 is altered relative to the beam path 2.

Figure 5:
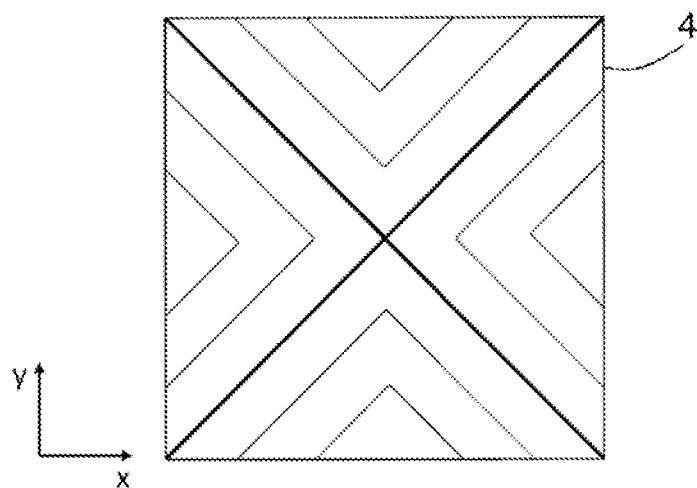
FIG. 5 shows a schematic illustration of a second exemplary embodiment of a phase element in the form of a refractive phase mask.

To generate a phase element 4, for example a quadrant phase mask, plane-parallel plates, for example, can be tilted and the refractive effect of the plates caused thereby can be used. Alternatively, use can be made of a refractive design, in respect of which a schematic example is indicated in FIG. 5. The continuous profile brings about imaging of four spots 9 in the detector plane 8, as already described in relation to FIG. 4.

A diffractive design of the phase element 4 can be chosen in further embodiments. Diffractive designs are usually producible in a simpler and more cost-effective manner than refractive designs.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Apparatus
2 Beam path, detection beam path
3 Optical axis
4 Phase element
4.1 to 4.$n$ Partial areas (of the phase element 4)
5.1 to 5.$n$ Partial beam
6 Optics
7 Detector
7.1 to 7.$n$ Detector element
7S Web
8 Detector plane
9 Spot
10 Evaluation unit
11 Control unit
12 Drive unit
13 Component
14 Pinhole

The invention claimed is:

1. Image capturing apparatus comprising a detection beam path for guiding detection radiation from a sample to a detector having a plurality of detector elements, wherein
    the detector has four or five detector elements; and further comprising
    an evaluation unit configured to carry out an evaluation in accordance with an Airyscan method on image data captured by means of the detector and which generates a high-resolution image.

2. Apparatus according to claim 1, wherein the detector is arranged in a detector plane that is conjugate to a focal plane.

3. Apparatus according to claim 1, wherein a pinhole with a fixed or variable diameter is arranged in the beam path in a plane that is conjugate to the focal plane.

4. Apparatus according to claim 1, wherein a phase element is arranged in the detection beam path, and incident detection radiation is split into at least two partial beams by effect of the phase element and each of the partial beams is steered to a different detector element of the detector in each case and captured as measurement values.

5. Image capturing method, comprising
    capturing detection radiation coming from a sample in a detection beam path by means of a detector which has a plurality of detector elements,
    comprising
    using a detector which has four or five detector elements and which captures image data and there is confocal parallel sampling of a point spread function; and
    evaluating the image data captured by means of the detector by means of an evaluation unit and a high-resolution image is generated.

6. Method according to claim 5, further comprising splitting said detection radiation into at least two partial beams and steering each of the partial beams to a different detector element of a detector in each case and captured as image values.

* * * * *